(12) United States Patent
Komizo

(10) Patent No.: US 7,232,406 B2
(45) Date of Patent: Jun. 19, 2007

(54) TOOL CHANGER OF MACHINE TOOL

(75) Inventor: Kei Komizo, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 0 days.

(21) Appl. No.: 11/398,766

(22) Filed: Apr. 6, 2006

(65) Prior Publication Data

US 2006/0270538 A1    Nov. 30, 2006

(30) Foreign Application Priority Data

May 30, 2005    (JP)    ............... 2005-156691

(51) Int. Cl.
  *B23Q 3/157*    (2006.01)
  *B23Q 11/08*    (2006.01)
  *B23B 3/00*    (2006.01)
  *B23P 23/02*    (2006.01)

(52) U.S. Cl. ............... 483/3; 483/14; 483/30; 29/27 C; 82/121; 82/117; 82/129; 82/137; 409/165; 409/202

(58) Field of Classification Search .......... 483/3, 483/14, 16, 30, 31, 36, 39, 40, 41; 29/27 C, 29/27 R, 33 P; 82/121, 117, 129, 137, 149, 82/148, 142, 118, 120; 409/165, 202, 212, 409/235, 234

See application file for complete search history.

(56) References Cited

U.S. PATENT DOCUMENTS

| 6,551,038 B1 * | 4/2003 | Sugata et al. .............. 409/134 |
| 6,640,677 B2 * | 11/2003 | Ueda et al. .................. 82/129 |
| 7,147,595 B1 * | 12/2006 | Chen .......................... 483/14 |
| 2005/0022351 A1 * | 2/2005 | Tokuma et al. ............. 29/27 C |

FOREIGN PATENT DOCUMENTS

JP    6-106438 A    4/1994

* cited by examiner

*Primary Examiner*—Dana Ross
(74) *Attorney, Agent, or Firm*—Smith Patent Office

(57) ABSTRACT

To provide a tool changer of a machine tool capable of preventing chips from scattering to the outside of the machine from an opening of a cover to adhere to a sliding portion or a gripper portion during tool change. A tool magazine 42 holding a large number of tools is disposed on a machine outer side of a cover 62 disposed to surround a machining area of a third spindle 6. The cover 62 has a tool through hole 62c from which a tool held by a tool holding part 6c of the third spindle 6 is protruded to the machine outer side of the cover 62. Tool change is performed while the tool is protruded to the machine outer side from the tool through hole 62c and the tool through hole 62c is closed by the tool holding part 6c.

7 Claims, 8 Drawing Sheets

TOOL CHANGER OF MACHINE TOOL

BACKGROUND OF THE INVENTION

1. Field of the Invention

The present invention relates to a tool changer of a machine tool in which a spindle is disposed on a bed and a machining area of the spindle is surrounded by a cover.

2. Description of the Related Art

An example of a machine tool of this type is structured such that a spindle headstock is fixedly disposed on a bed, a lower tool post and an upper is tool post are disposed on a machine outer side and a machine inner side of an axis of the spindle headstock respectively to be movable in an X-axis direction and a Z-axis direction, and the lower and upper tool posts machine a workpiece.

As an example of a tool changer of the above-described machine tool, proposed is a structure in which a tool change opening part is formed in a cover covering a tool magazine, a door opening/closing the opening part is disposed, and at the time of tool change, the door is opened and a preceding-process tool is changed to a subsequent-process tool (see, for example, Patent document 1).

[Patent document 1] Japanese Patent Application Laid-open No. Hei 6-106438

In view of enhancing machining efficiency, a tool of the upper tool post is sometimes changed while a workpiece is machined by the lower tool post. In such a case, the aforesaid conventional tool changer changes the tool while the opening of the cover is kept open, so that chips may possibly scatter from the opening to the outside during the tool change and in some cases, the scattered chips adhere to a sliding portion, a tool gripper portion, and so on of the tool changer.

SUMMARY OF THE INVENTION

The present invention was made in consideration of the conventional circumstances described above and it is an object thereof to provide a tool changer of a machine tool capable of preventing chips from scattering to the outside to adhere to a sliding portion or a gripper portion while a tool is changed.

In an invention, a tool changer of a machine tool includes a bed; a spindle provided on the bed; and a cover disposed to surround a machining area of the spindle, the tool changer including a tool magazine disposed on a machine outer side of the cover to hold a large number of tools, wherein the cover has a tool through hole, a tool held by a tool holding part of the spindle is changed to a tool on the tool magazine side while the tool held by the tool holding part is protruded from the through hole to the machine outer side of the cover and the tool through hole is closed by the tool holding part.

In the above-described embodiment, the tool change is performed while the tool held by the tool holding part of the spindle is protruded to the machine outer side from the tool through hole of the cover and the through hole is closed by the tool holding part. Therefore, chips do not scatter to the outside from the through hole even when the tool of the spindle is changed during machining by, for example, a tool post, so that it is possible to prevent the chips from adhering to a sliding portion or a gripper portion of the tool changer.

In a preferable embodiment of the invention, the tool holding part has a sealing surface in a tapered shape, and the tool through hole of the cover is formed in a tapered shape fittable to the sealing surface of the tool holding part.

In the above-described embodiment, the tapered sealing surface of the tool holding part is fitted to the tapered sealing surface formed in a peripheral edge of the through hole. Therefore, a gap between the through hole of the cover and the tool holding part of the spindle can be surely sealed, which can surely prevent chips from scattering to the outside from the through hole.

In another preferable embodiment of the invention, a shutter is provided for the tool through hole of the cover to close the tool through hole during machining and to open the tool through hole during the tool change.

In the above-described embodiment, since the tool through hole of the cover is closed by the shutter, chips do not scatter to the outside during machining.

In still another preferable embodiment of the invention, further comprising a tool carrier mechanism carrying the tool held by the tool magazine to a tool change position and disposed so as to pass through an inner side of a loop chain of the tool magazine.

In the above-described embodiment, since the carrier mechanism carrying the tool held by the tool magazine to the tool change position is disposed to pass through the inner side of the loop chain, a vacant space of the loop chain of the tool magazine can be effectively used for arranging the carrier mechanism, which enables downsizing of the whole tool changer.

DETAILED DESCRIPTION OF THE PREFERRED EMBODIMENTS

Embodiments of the present invention will be hereinafter described based on the attached drawings.

Figure 1:
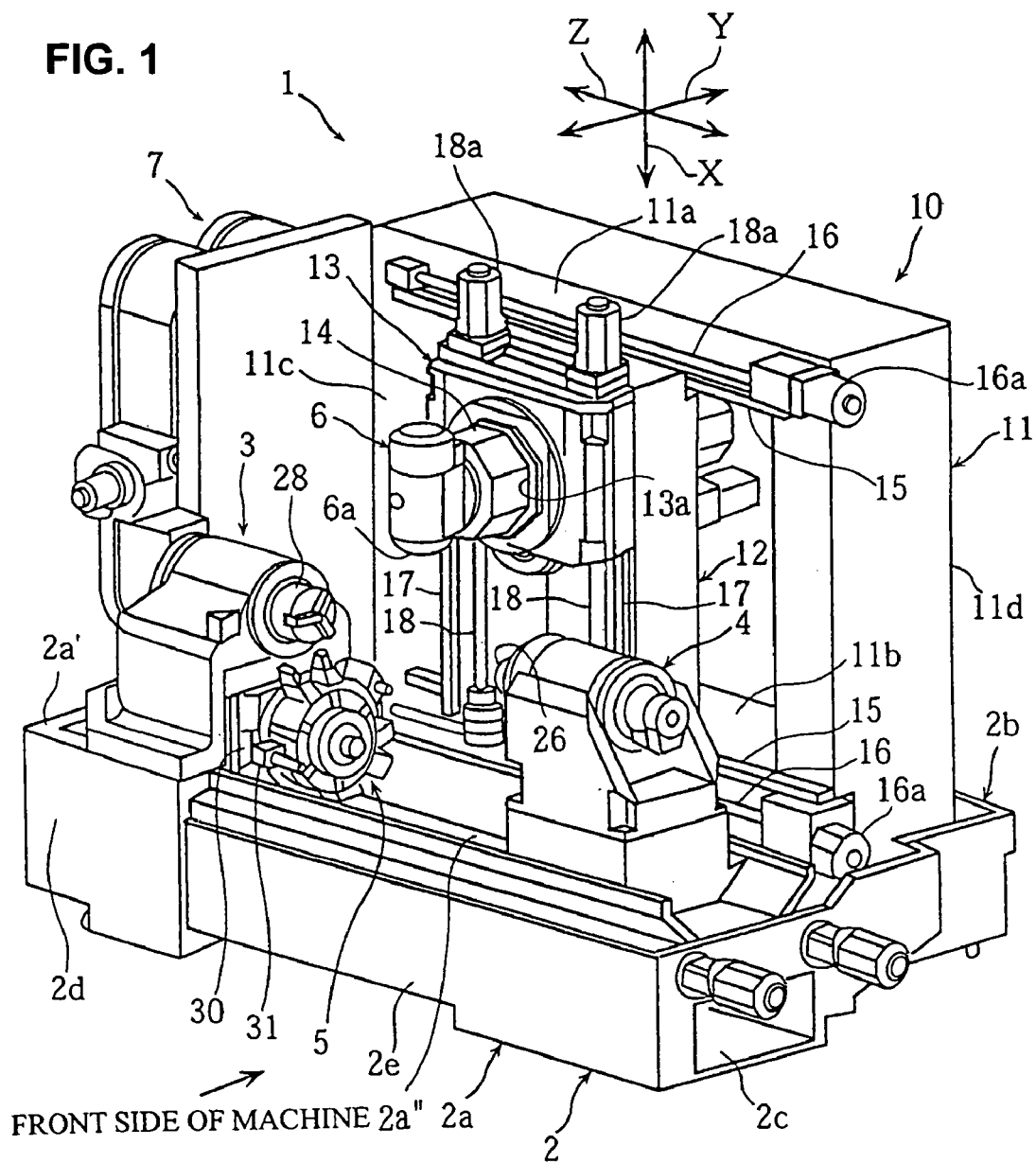
FIG. 1 is a perspective view of a composite lathe according to one embodiment of the present invention.
Figure 2:
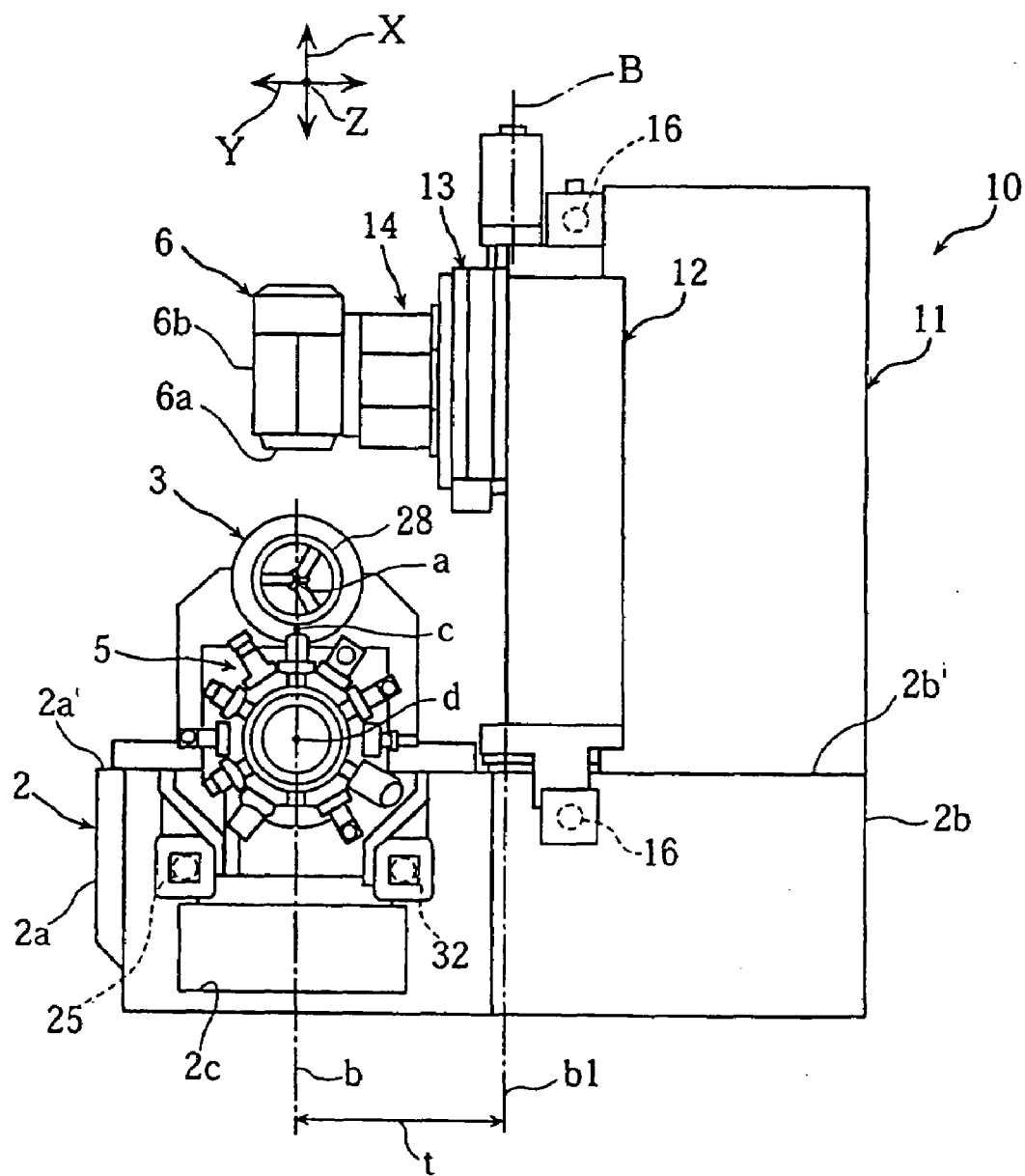
FIG. 2 is a side view of the composite lathe.
Figure 3:
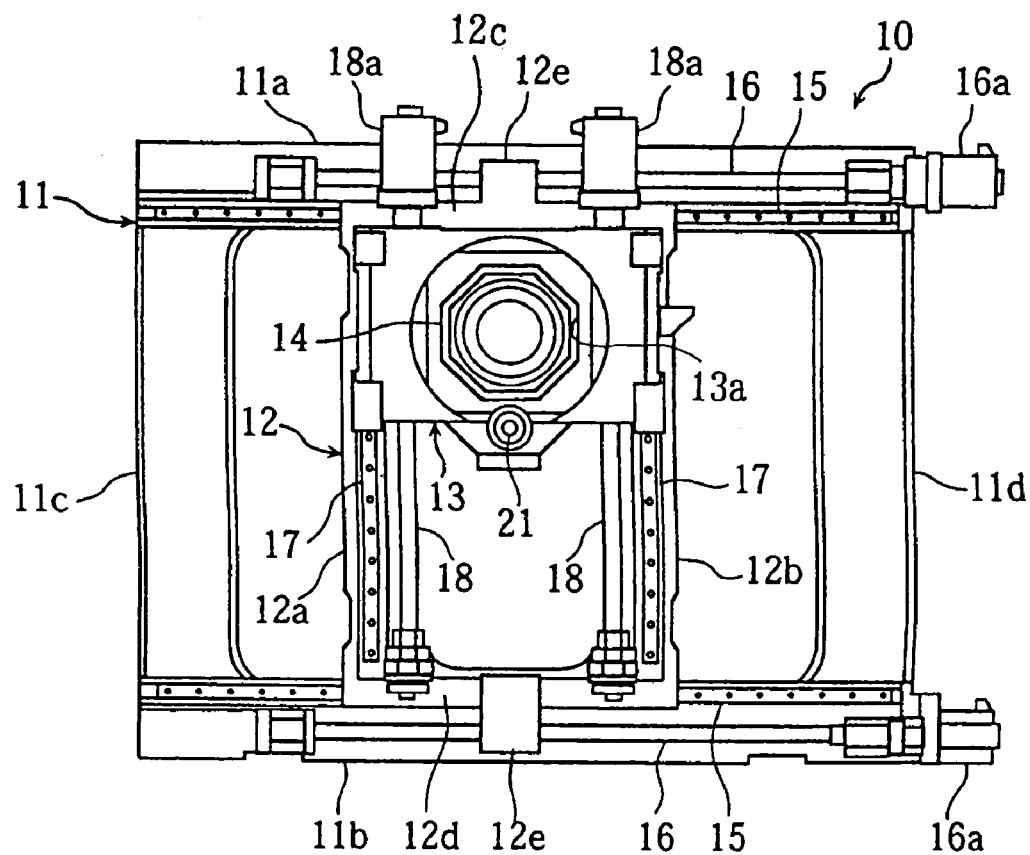
FIG. 3 is a front view of a spindle supporting mechanism of the composite lathe.
Figure 4:
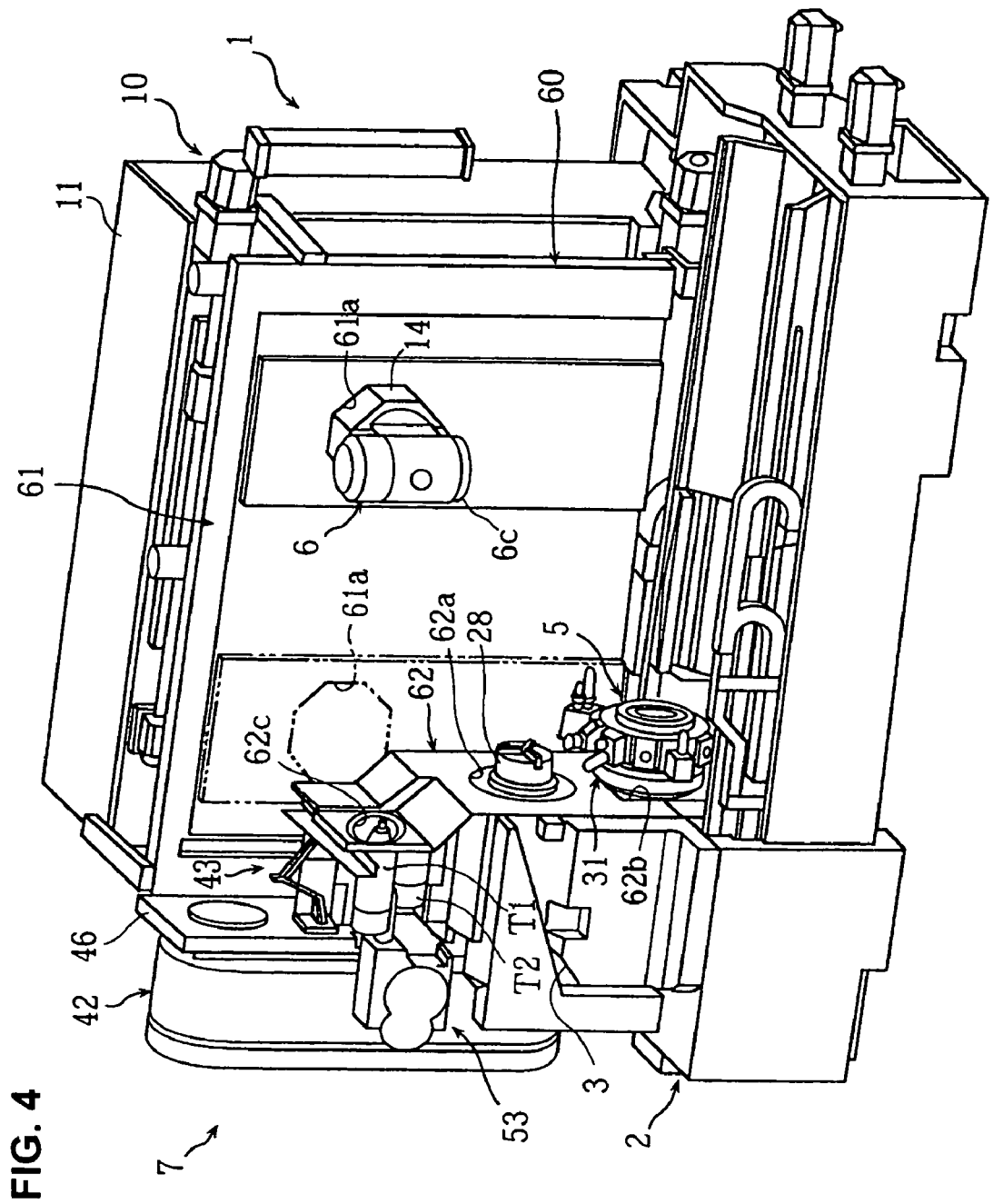
FIG. 4 is a perspective view of the composite lathe in which a cover is provided.
Figure 5:
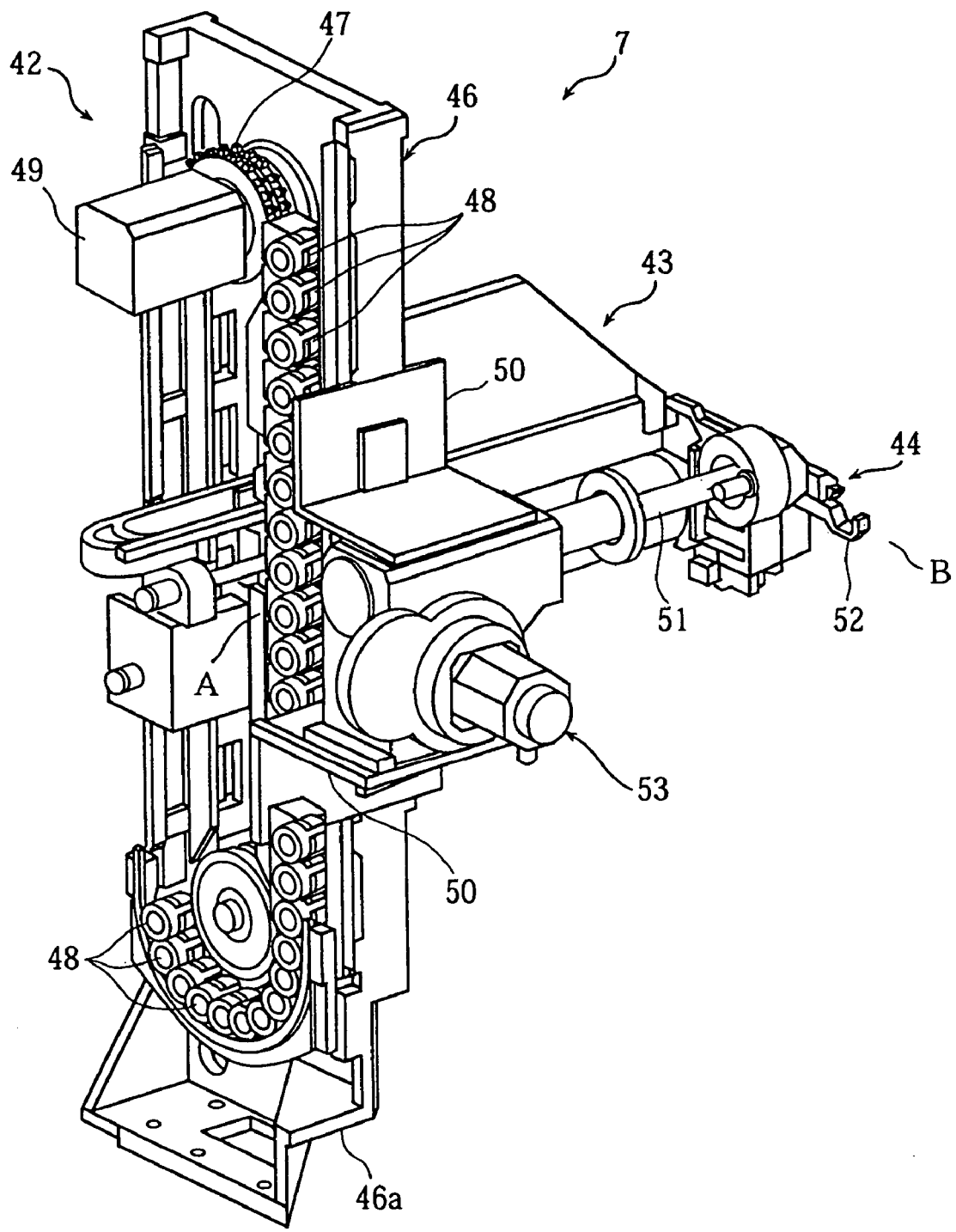
FIG. 5 is a side view of a tool changer of the composite lathe.
Figure 6B:
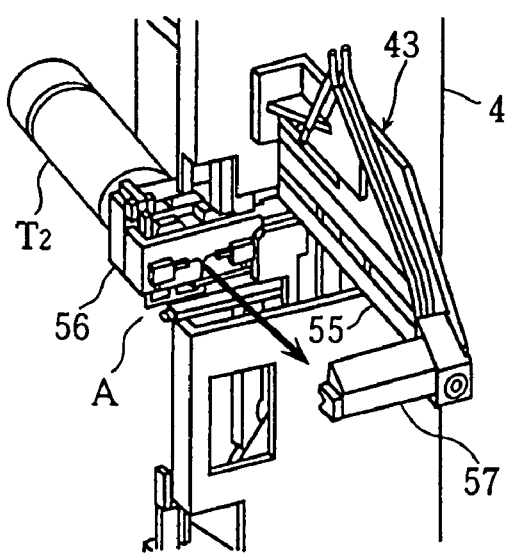
FIG. 6(*a*) to FIG. 6(*d*) are views showing operations of the tool changer.
Figure 6A:
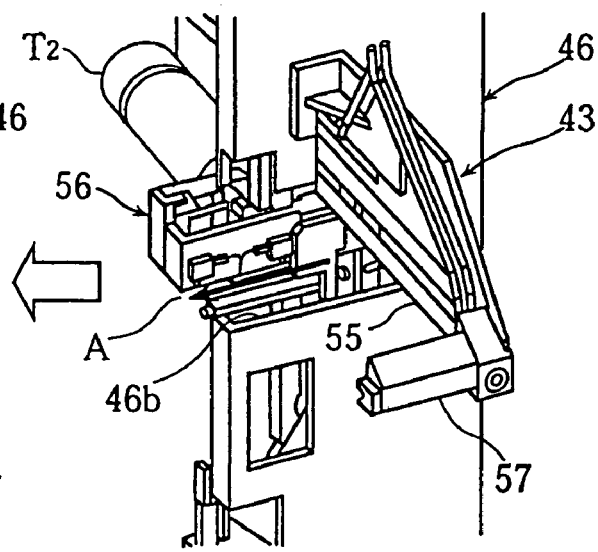
Figure 6C:
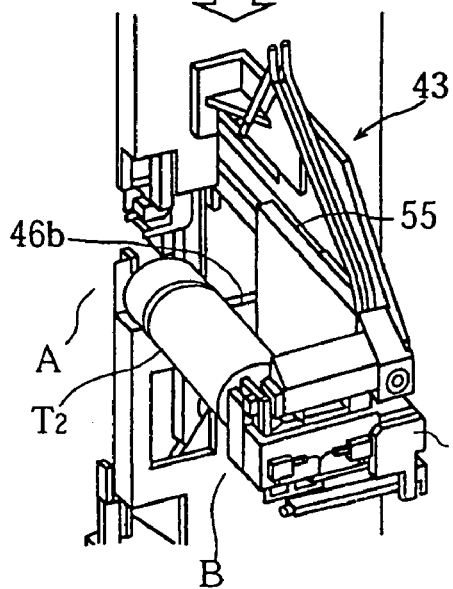
Figure 6D:
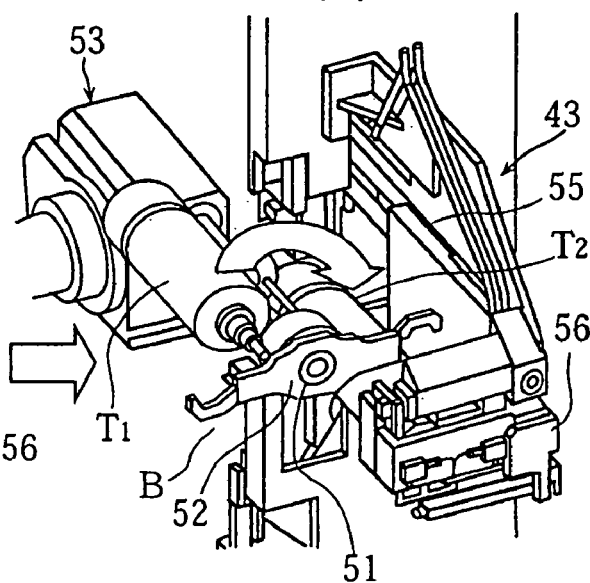
Figure 7:
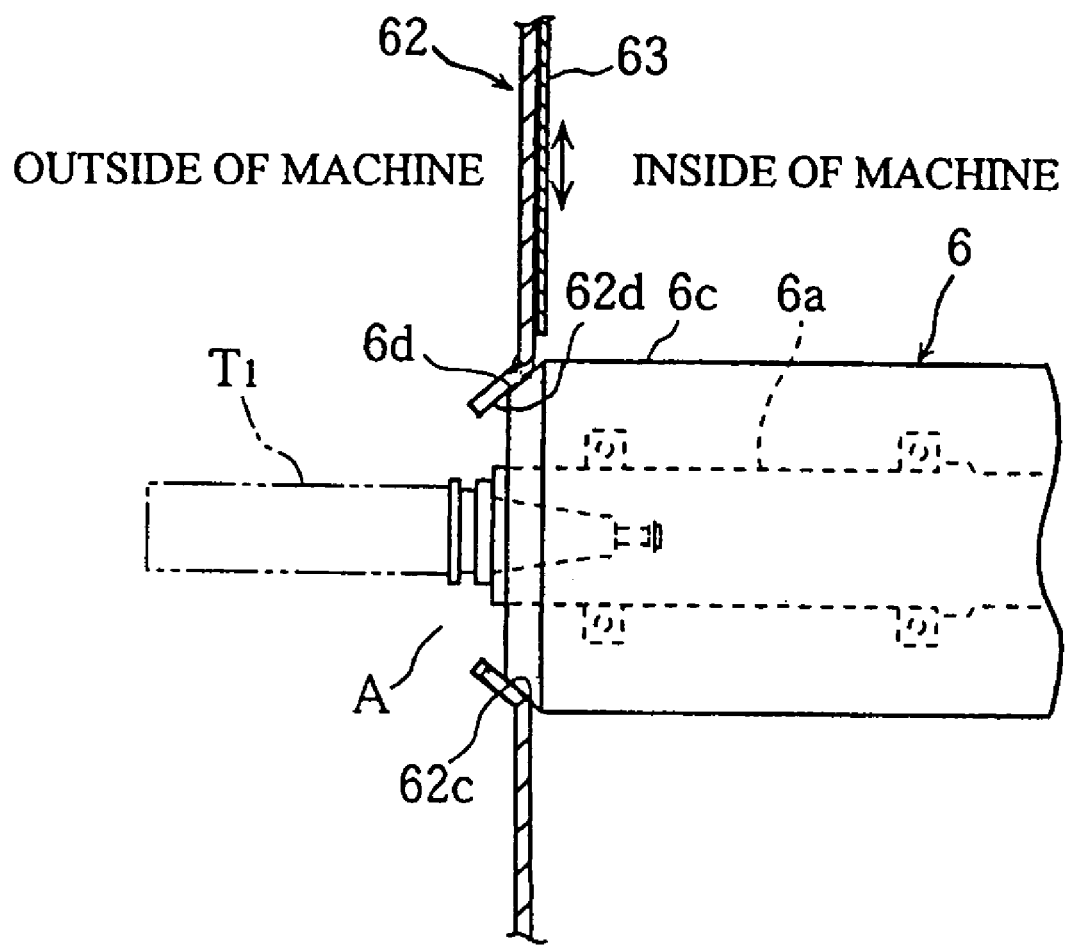
FIG. 7 is a view showing a tool change state.

FIG. 1 to FIG. 7 are views to illustrate a tool changer of a composite lathe according to one embodiment of the present invention. FIG. 1 and FIG. 2 are a perspective view and a right side view of the composite lathe including a tool changer, FIG. 3 is a front view of a spindle supporting mechanism supporting a third spindle, FIG. 4 is a perspective view of a machine main body in which a cover is provided, FIG. 5 is a perspective view of the tool changer, FIG. 6(*a*) to FIG. 6(*d*) are views showing operations of the tool changer, and FIG. 7 is a view showing a tool change state. Note that front/back and left/right mentioned in this embodiment mean front/back and left/right when the machine is seen from a front side, unless otherwise noted.

In the drawings, 1 denotes the composite lathe. When seen from the front side of the machine shown in FIG. 1, the composite lathe 1 includes: a bed 2; a first spindle headstock 3 disposed on the bed 2; a second spindle headstock 4 coaxial with the first spindle headstock 3 and movable in a Z-axis (left/right) direction; a tool post 5 disposed between the first and second spindle headstocks 3, 4 to be movable in an X-axis (up/down) direction and in the Z-axis direction; and a third spindle 6 disposed on the bed 2 to be movable in the X-axis direction, a Y-axis (front/back) direction, and the Z-axis direction. On a left side portion on the bed 2, provided is a tool changer 7 automatically changing a preceding-process tool attached to the third spindle 6 to a subsequent-process tool. Note that the third spindle 6 corresponds to a spindle of the present invention.

The bed 2 is constituted of a front bed part 2*a* and a back bed part 2*b* which are integrally formed. A first and a second mounting surface 2*a*', 2*a*" are formed on the front bed part 2*a*, and third mounting surfaces 2*b*' are formed on the back bed part 2*b*, all these surfaces being horizontal along the Z-axis direction and the Y-axis direction.

Compared with the second mounting surface 2*a*" of the front bed part 2*a*, the first mounting surface 2*a*' is positioned higher than the second mounting surface 2*a*", and the third mounting surfaces 2*b*' of the back bed part 2*b* are positioned lower than the first mounting surface 2*a*' and positioned higher than the second mounting surface 2*a*", so that they are formed in a stepped manner.

The first spindle headstock 3 is mounted on the first mounting surface 2*a*'. On the second mounting surface 2*a*", the second spindle headstock 4 and the tool post 5 are movably mounted. Further, on the third mounting surfaces 2*b*', a spindle supporting mechanism 10 movably supporting the third spindle 6 is mounted.

A first and a second spindle 28, 26 are rotatably inserted in the first and second spindle headstocks 3, 4. The second spindle headstock 4 is movable to a delivery position where it can directly receive a workpiece attached to the first spindle 28 of the first spindle headstock 3. Concretely, the second spindle headstock 4 is movable in the Z-axis direction up to a position so that front faces of chucks of the first and second spindles 28, 26 abuttingly face each other.

The tool post 5 has: a turret 31 to whose outer circumferential portion a large number of tools T are attached at a predetermined interval apart from one another and which rotary-indexes and positions a desired tool T at a predetermined machining position to clamp it at the machining position; and a supporting member 30 by which the turret 31 is supported to be movable in the X-axis direction.

When the first and second spindles 28, 26 abut on each other, the tool post 5 is positioned right under the first spindle headstock 3 so that its cutting point "c" is positioned vertically under an axis "a" of the first and second spindle headstocks 3, 4. Therefore, a workpiece cutting direction of the tool of the turret 31 is in line with a vertical line "b". Concretely, when seen from a right side in the Z-axis direction, as shown in FIG. 2, the cutting point "c" and a rotation center "d" of the turret 31 are collinear on the vertical line "b" going through the axis "a" of the first and second spindle headstocks 3, 4.

The spindle supporting mechanism 10 includes: a column 11 in a rectangular frame shape which is fixed on the third mounting surfaces 2*b*' of the back bed part 2*b* to extend vertically upward; a saddle 12 in a rectangular frame shape which is supported on a front face of the column 11 to be movable in the Z-axis direction; a cross slide 13 supported on a front face of the saddle 12 to be movable in the X-axis direction; and a ram 14 supported by the cross slide 13 to be movable in the Y-axis direction and supporting the third spindle 6.

The column 11 is structured such that left and right support posts 11*c*, 11*d* and upper and lower beam parts 11*a*, 11*b*, which couple upper and lower ends of the left and right support posts 11*c*, 11*d*, are integrally molded. The column 11 is firmly fixed on the third mounting surfaces 2*b*' of the back bed part 2*b*.

Similarly to the column 11, the saddle 12 is structured such that left and right support posts 12*a*, 12*b* and upper and lower beam parts 12*c*, 12*d*, which couple upper and lower ends of the left and right support posts 12*a*, 12*b*, are integrally molded. The saddle 12 is supported to be movable in the Z-axis direction by a pair of upper and lower Z-axis guide rails 15, 15 which are disposed in parallel to the Z axis on front faces of the upper and lower beam parts 11*a*, 11*b* of the column 11. Z-axis ball screws 16, 16 are screwed to nut parts 12*e*, 12*e* formed in the upper and lower beam parts 12*c*, 12*d* of the saddle 12. The saddle 12 is driven to reciprocate in the Z-axis direction when the Z-axis ball screws 16, 16 are synchronously driven by servo motors 16*a*, 16*a*. Note that the Z-axis ball screws 16, 16 are disposed in parallel to the Z-axis on the front faces of the upper and lower beam parts 11*a*, 11*b* of the column 11.

The cross slide 13 is formed in a rectangular flat plate shape and is supported to be movable in the X-axis direction by a pair of left and right X-axis guide rails 17, 17 which are disposed in parallel to the X axis on the front faces of the left and right support posts 12*a*, 12*b* of the saddle 12. X-axis ball screws 18, 18 are screwed to nut parts formed on left and right sides of the cross slide 13. The cross slide 13 is driven to reciprocate in the X-axis direction when the X-axis ball screws 18, 18 are rotary driven by servo motors 18*a*, 18*a*. Note that the X-axis ball screws 18, 18 are disposed in parallel to the X axis on the front faces of the left and right support posts 12*a*, 12*b* of the saddle 12.

The ram 14 is inserted in a ram guide hole 13*a* formed in the cross slide 13 and is supported to be movable in the Y-axis direction by guide plates (not shown) which are arranged on an inner circumferential surface of the ram guide hole 13*a*, being a predetermined angle apart from one another. One Y-axis ball screw 21 disposed in a lower portion of a widthwise center of the cross slide 13 is screwed to a nut part of the ram 14. The ram 14 is driven to reciprocate in the Y-axis direction when the Y-axis ball screw 21 is rotary driven by a servo motor.

The third spindle 6 is rotatably inserted in the ram 14. At a tip of the third spindle 6, a tool spindle 6*a* is disposed, with its axis directed perpendicularly to the Y axis. A tool is attached to a tip of the tool spindle 6*a* and the tool spindle 6*a* is rotary driven by a driving motor 6*b*. Further, the third spindle 6 can be rotary-indexed around the Y axis for positioning by a built-in rotary-indexing mechanism (not shown).

A cutting point of the third spindle 6 is constantly positioned within an area surrounded by the aforesaid pair of upper and lower Z-axis ball screws 16, 16 and pair of left and right X-axis ball screws 18, 18. A movement area of the cutting point of the third spindle 6 overlaps a movement area of the cutting point "c" of the tool post 5 and further includes an area under the cutting point "c" when seen in the Z-axis direction shown in FIG. 2.

The tool changer 7 includes: a tool magazine 42 holding a large number of tools and rotary-indexing a desired subsequent-process tool T2 to position it at a tool delivery position A; a tool carrier mechanism 43 taking out the subsequent-process tool T2 rotary-indexed at the tool delivery position A to carry it to a tool change position B; and a tool change mechanism 44 changing a preceding-process tool T1 held by the third spindle 6 to the subsequent-process tool T2 carried to the tool change position B.

The tool magazine 42 includes: a magazine supporting base 46 in a rectangular plate shape extending vertically upward, with a lower end portion 46a thereof being fixed on a left end portion of the bed 2 between the first spindle head stock 3 and the column 11; a loop chain 47 rotatably supported by the magazine supporting base 46; a large number of tool supporting pots 48 arranged on the loop chain 47 at a predetermined pitch to attachably/detachably support the tools; and a rotary driving motor 49 driving the rotating movement of the loop chain.

The tool carrier mechanism 43 includes: a transfer rail 55 fixedly supported by a machine inner side wall of the magazine supporting base 46 and linearly extending from the tool delivery position A to the tool change position B; a transfer supporting member 56 movably supported by the transfer rail 55 to take out the subsequent-process tool T2 positioned at the tool delivery position A from the tool supporting pot 48; and a driving motor 57 by which the transfer supporting member 56 is driven to reciprocate between the tool delivery position A and the tool change position B.

A cutout portion 46b opening toward a front side is formed in a tool delivery portion of the magazine supporting base 46. The transfer rail 55 is disposed to be inserted through the cutout portion 46b and to pass through the inside of the loop chain 47.

The tool change mechanism 44 includes: a change shaft 51 rotatably supported by the magazine supporting base 46; a change arm 52 attached to a tip portion of the change shaft 51; and a driving part 53 by which the change shaft 51 is driven to reciprocate in the axis direction and to rotate.

The composite lathe 1 includes a cover 60 surrounding the whole area of front and back sides, left and right sides, and a ceiling side of the machining areas of the tool post 5 and the third spindle 6. This cover 60 is mainly composed of: a slide cover 61 disposed between the third spindle 6 and the spindle supporting mechanism 10 and slidable in the X-axis and Z-axis directions together with the third spindle 6; and a left side cover 62 covering the first spindle headstock 3 and the tool post 5. The tool changer 7 is disposed on the machine outer side of the left side cover 62 of the cover 60.

A ram through hole 61a is formed in the slide cover 61, and a gap between the ram through hole 61a and the ram 14 inserted through the through hole 61a is slidably sealed.

A spindle through hole 62a through which the first spindle 28 is inserted is formed in the left side cover 62. A gap between the spindle through hole 62a and the first spindle 28 is sealed. Further, a cutout 62b in which the tool post 5 is disposed to be vertically movable is formed in the left side cover 62, and a gap between the cutout 62b and the tool post 5 is sealed by a separate seal plate.

In a portion of the left side cover 62 vertically above the first spindle headstock 3, formed is a tool through hole 62c via which the inside and outside of the machine communicate with each other. The tool through hole 62c has a size allowing the tool T1 held by the tool holding part 6c of the third spindle 6 to protrude therefrom to the machine outer side.

Further, a tapered sealing surface 6d is formed in a tip portion of the tool holding part 6c of the third spindle 6. In a peripheral edge of the tool through hole 62c of the side cover 62, a sealing surface 62d to which the sealing surface 6d of the tool holding part 6c is fittable is formed to be bent in a tapered shape.

Further, a shutter 63 opening/closing the tool through hole 62c is provided on the machine inner side of the left side cover 62. The shutter 63 is driven to open/close so as to close the tool through hole 62c during a normal state including a machining period and to open only at the time of the tool change.

In the composite lathe 1 of this embodiment, while the workpiece is rotated by the first spindle 28 of the first spindle headstock 3 or the second spindle 26 of the second spindle headstock 4, the tool post 5 cuts in the workpiece to perform cutting work and the third spindle 6 performs machining such as grinding and boring.

Then, when the workpiece machining by the third spindle 6 is finished and workpiece machining by the tool post 5 is started, the third spindle 6 is rotary-indexed for positioning so that the tool spindle 6a is directed in a horizontal direction parallel to the Z-axis direction, and the shutter 63 moves up to open the tool through hole 62c. Subsequently, the third spindle 6 moves so that the tool holding part 6c thereof is inserted in the tool through hole 62c, and the sealing surface 6d of the tool holding part 6c is fitted to the sealing surface 62d of the tool through hole 62c. Consequently, the tool through hole 62c is closed, and at the same time, the third spindle 6 is positioned at the tool change position B (see FIG. 4 and FIG. 7).

When the machining by the third spindle 6 is finished, the tool magazine 42 rotary-indexes the subsequent-process tool T2 to position it at the tool delivery position A (see FIG. 6(a)). The transfer supporting member 56 takes out the subsequent-process tool T2 positioned at the tool delivery position A and carries the subsequent-process tool T2 to the tool change position B to position it at the tool change position B (see FIG. 6(b) and FIG. 6(c)). Next, the change arm 52 changes the preceding-process tool T1 attached to the third spindle 6 to the subsequent-process tool T2 held by the transfer supporting member 56 (see FIG. 6(d)). Thereafter, the preceding-process tool T1 is returned to a predetermined one of the tool supporting pots 48 of the tool magazine 42, and the subsequent-process tool T2 attached to the third spindle 6 performs workpiece machining of a subsequent step.

As described above, according to this embodiment, the tool change is performed while the tool held by the tool holding part 6c of the third spindle 6 is protruded from the tool through hole 62c of the left side cover 62 to the machine outer side and the through hole 62c is closed by the tool holding part 6c. Therefore, even when the tool of the third spindle 6 is changed during machining by the tool post 5, chips do not scatter to the outside of the machine from the tool through hole 62c, so that it is possible to prevent the chips from adhering to a sliding portion or a gripper portion of the tool changer 7.

In this embodiment, the tapered sealing surface 6d is formed in the tool holding part 6c of the third spindle 6, and this sealing surface 6d is fitted to the tapered sealing surface 62d formed in the peripheral edge of the tool through hole 62c. Therefore, the tool through hole 62c of the side cover 62 can be sealed by the third spindle 6, which can surely prevent the entrance of the chips.

In this embodiment, since the tool through hole 62c of the side cover 62 is closed by the shutter 63, chips do not enter during machining by the third spindle 6 and by the tool post 5.

In this embodiment, since the transfer rail 55 carrying the subsequent-process tool T2 held by the tool magazine 42 to the tool change position B is disposed to pass through the inside of the loop chain 47. Therefore, a vacant space of the loop chain 47 of the tool magazine 42 can be effectively used for arranging the transfer rail 55, which allows downsizing of the whole tool changer.

Figure 8:
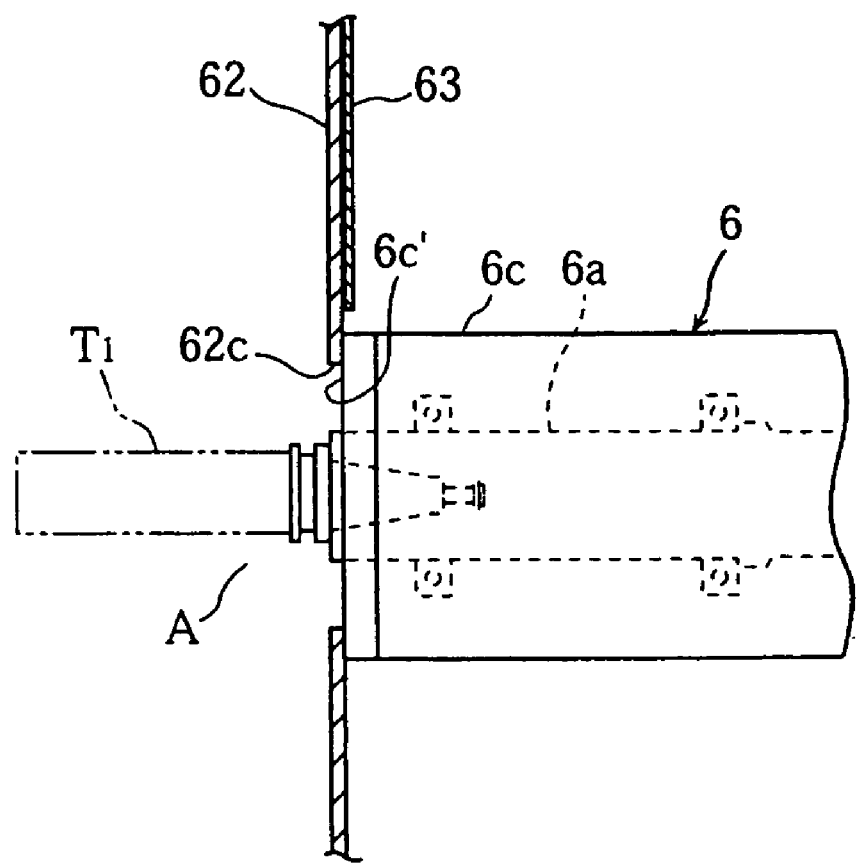
FIG. 8 is a view showing a tool change state according to another embodiment of the present invention.

In this embodiment, the tool through hole 62*c* and the tool holding part 6*c* are both formed in the tapered shape so that they are fitted to each other. Another possible structure in the present invention is such that an end surface 6*c*' of the tool holding part 6*c* of the third spindle 6 abut on the peripheral edge portion of the tool through hole 62*c* as shown in FIG. 8, thereby closing the tool through hole 62*c*. In this case, substantially the same effects as those of the above-described embodiment are also obtainable.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A tool changer of a machine tool including: a bed; a spindle provided on the bed; and a cover disposed to surround a machining area of the spindle, the tool changer comprising a tool magazine disposed on a machine outer side of the cover to hold a large number of tools, wherein the cover has a tool through hole, and a tool held by a tool holding part of the spindle is changed to a tool on the tool magazine side while the tool held by the tool holding part is protruded from the through hole to the machine outer side of the cover and the tool through hole is closed by the tool holding part.

2. The tool changer of the machine tool according to claim 1, wherein the tool holding part has a sealing surface in a tapered shape, and the tool through hole of the cover is formed in a tapered shape fittable to the sealing surface of the tool holding part.

3. The tool changer of the machine tool according to claim 1, wherein a shutter is provided for the tool through hole of the cover to close the tool through hole during machining and to open the tool through hole during the tool change.

4. The tool changer of the machine tool according to claim 1, further comprising a tool carrier mechanism carrying the tool held by the tool magazine to a tool change position and disposed so as to pass through an inner side of a loop chain of the tool magazine.

5. The tool changer of the machine tool according to claim 3, further comprising a tool carrier mechanism carrying the tool held by the tool magazine to a tool change position and disposed so as to pass through an inner side of a loop chain of the tool magazine.

6. The tool changer of the machine tool according to claim 2, wherein a shutter is provided for the tool through hole of the cover to close the tool through hole during machining and to open the tool through hole during the tool change.

7. The tool changer of the machine tool according to claim 2, further comprising a tool carrier mechanism carrying the tool held by the tool magazine to a tool change position and disposed so as to pass through an inner side of a loop chain of the tool magazine.

* * * * *